United States Patent [19]

Kauss et al.

[11] Patent Number: 4,835,966

[45] Date of Patent: Jun. 6, 1989

[54] CONTROL SWITCHING ARRANGEMENT FOR A HYDRAULIC POWER LIFT

[75] Inventors: Wolfgang Kauss, Lohr-Wombach; Heinz Schulte, Marktheidenfeld, both of

[73] Assignee: Mannesmann Rexroth GmbH, Lohr am Main, Fed. Rep. of Germany

[21] Appl. No.: 62,621

[22] Filed: Jun. 16, 1987

[30] Foreign Application Priority Data

Jun. 30, 1986 [DE] Fed. Rep. of Germany ....... 3621854

[51] Int. Cl.4 .................................... F16D 31/02

[52] U.S. Cl. .................................... 60/376; 60/468; 91/420; 91/445; 91/446; 91/461

[58] Field of Search ................. 91/444, 445, 446, 447, 91/461, 420, 443; 60/376

[56] References Cited

U.S. PATENT DOCUMENTS

| | | | |
|---|---|---|---|
| 3,623,509 | 11/1971 | Sesseler et al. | 91/443 X |
| 3,960,059 | 6/1976 | Schexnayder | 91/461 X |
| 4,179,889 | 12/1979 | Gondek | 91/461 X |
| 4,292,884 | 10/1981 | Schumacher et al. | 91/445 |
| 4,442,912 | 4/1984 | Vette | 91/420 X |
| 4,531,449 | 7/1985 | Reith | 91/420 |

FOREIGN PATENT DOCUMENTS

| | | |
|---|---|---|
| 2940403 | 4/1981 | Fed. Rep. of Germany . |
| 3247420 | 7/1984 | Fed. Rep. of Germany . |
| 3318052 | 7/1984 | Fed. Rep. of Germany . |
| 3441946 | 5/1986 | Fed. Rep. of Germany . |

*Primary Examiner*—Edward K. Look

*Attorney, Agent, or Firm*—Burns, Doane, Swecker & Mathis

[57] ABSTRACT

A control switching arrangement for a hydraulic power lift control system comprises a power lift control valve which is controlled via control lines in a low pressure section. The main hydraulic section is controlled by the said control valve via a check valve which is hydraulically openable, at least for carrying out lowering movement by the power lift. The check valve is opened via the said control valve itself, which furnishes the switching line a pressure generally equal to the circulation pressure of the main hydraulic section. Further, means are provided whereby, in the switching state corresponding to lowering movement of the power lift, the circulation pressure of the main hydraulic section can be increased. With this control system the low pressure control section is simplified, and energy losses in the control system are kept as low as possible.

16 Claims, 3 Drawing Sheets

CONTROL SWITCHING ARRANGEMENT FOR A HYDRAULIC POWER LIFT

FIELD OF THE INVENTION AND BACKGROUND

The invention relates to a hydraulic control switching arrangement for a control system of a hydraulic power lift. Such control system is of a type in which a control valve is controlled via control lines of a low pressure loop.

In German patent publication DE-OS No. 29 40 403 there is disclosed a control switching arrangement in which a power lift control valve controls the high pressure working section powered by a first pump. The control valve itself however, is controlled by a low pressure control section powered by a second pump.

Since the lifting cylinder of the power lift cannot be sealed with zero oil leakage, it is advantageous to include a check valve in the working pressure line from the power lift control valve to the power lift piston, which valve opens in the direction toward the power lift, and which valve is hydraulically openable at least for lowering movements of the lift piston. Such a hydraulically openable check valve, often designated a "shutoff block" in the art, is known, e.g. from German patent publication DE-OS No. 32 47 420.

Previously, the hydraulic energy for opening an hydraulically openable check valve came from a low pressure control section, and the control connections were relatively complex and required a relatively large space.

SUMMARY OF THE INVENTION

A main object of the invention is to devise a control arrangement wherein one no longer needs to employ the low pressure control section for controlling the shutoff block, but wherein the energy losses in the control system are kept as low as possible.

According to the invention, the control valve itself is employed for opening the check valve. The pressure required for opening the shutoff block is derived from the main hydraulic section. In particular, the pump circulation pressure prevailing in the main hydraulic section prior to the opening of the shutoff block is increased sufficiently that the shutoff block can be opened. By this stratagem, the pump circulation pressure ordinarily can be kept at a very low level, so that losses can be minimized, but a sufficiently higher pressure can be developed for reliably opening the shutoff block when it comes time to do so.

A control arrangement in accordance with the invention is particularly suited for a power lift control system of the type known as a "load-sensing" system. This type of control system has recently come into increasingly wide use. Here the control valve is configured as a so-called "open-center load-sensing valve" whereby the pressure of the main hydraulic section which supplies the power lift is controlled via a load-sensing line which acts on a piston-type pressure regulator disposed downstream of the pump of the main hydraulic section. In this case it is particularly advantageous if the control arrangement is configured so that, in the switching process for the power lift control valve, the switching line for the shutoff block is furnished with an additional amount of hydraulic fluid which also is fed to the load-sensing line by way of a throttle. This additional supply of fluid increases the pressure in the load-sensing line, whereby the pump circulation pressure is increased to the extent that the pressure in the switching line is sufficient to open the shutoff block. In this embodiment, the additional cost of controlling the shutoff block is limited to the cost of a switching line between the main control valve and the shutoff block, and one connecting line for use as a load-sensing line at such control valve.

If a check valve opening in the direction of the load-sensing line is connected downstream of the throttle in the connecting line between the switching line and the load-sensing line, this prevents the relatively high pressure in the load-sensing line from propagating into the switching line during the lifting operation of the power lift. Consequently, the check valve can function continuously during the lifting operation of the power lift.

Another feature of the invention has the particular advantage of permitting the buildup of pressure in the switching line to occur in the shortest possible time, which pressure controls the shutoff block. During circulation operation of the main pump, the load-sensing line is furnished with a predetermined purge amount of hydraulic fluid which can be throttled to tank by way of an internal throttle section of a quick acting slide valve. In this case the parameters of the internal throttle of the quick-action slide valve should be chosen such that in no-load operation, i.e. under the minimum pump circulation pressure, the exact same amount of hydraulic fluid is fed to the load-sensing line as can pass into the tank through the internal throttle. If now the pump circulation pressure at the switching line is controlled via the power lift control valve, the additional hydraulic fluid supplied to the load-sensing line via the switching line cannot be completely drained via the fixed internal throttle, so that, as mentioned above, the pressure in the load-sensing line builds up.

A particularly useful refinement is provided when the internal throttle of the quick-action slide valve is adjusted to coordinate with a second throttle which supplies the load-sensing line with a certain amount of hydraulic fluid for purging. This enables the purge amount to be kept as small as possible, in order to improve energy efficiency.

The constant supply of hydraulic fluid to the load-sensing line results in a situation where the switching of the power lift control valve is immediately reflected in a pressure increase in the load-sensing line, and accordingly the control arrangement provided by the present invention does not require additional components to increase the pressure in the main hydraulic section. It turns out that it is sufficient if the load-sensing device acts further on a pressure regulator in the main hydraulic section via a selector valve. Hence, the new control arrangement does not lead to undue complexity in the main hydraulic section.

Further simplification and reduction of the number of components required for the control arrangement are provided when the quick-action slide valve is controlled via the power lift control valve. In this case it is advantageous for the quick-action slide valve to be operated by piston mean exposed in one direction to the pressure in the load-sensing line and exposed in the other direction to the main control valve in such a way that the internal throttle section of the quick action slide valve can be shut off from the tank when the main control valve is in its load lifting position. This ensures reliable actuation of said valve for the lifting operation. Another advantage of this embodiment is that, when the lowering operation of the power lift begins, the quick-action slide valve remains reliably in the position which enables pressure buildup in the load-sensing line in order to open the shutoff block.

Additional features and advantages of the invention will become evident from a consideration of the following detailed descriptions and claims.

BRIEF DESCRIPTION OF THE DRAWINGS

An exemplary embodiment will be described in some detail with reference to the schematic drawings, in which.

DETAILED DESCRIPTION OF PREFERRED EMBODIMENTS

Figure 1:
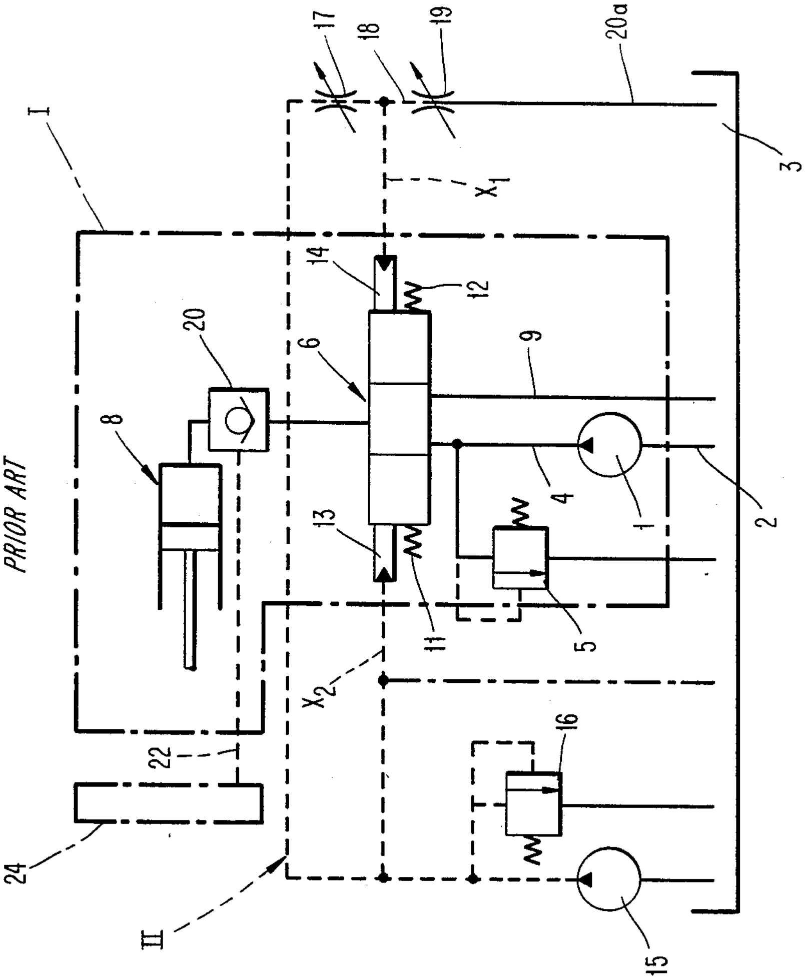
FIG. 1 PRIOR ART
FIG. 1 shows a hydraulic switching arrangement or circuit for regulating a power lift according to the state of the art.

The hydraulic switching arrangement illustrated in FIG. 1 has a main hydraulic section or circuit "I" and a low pressure control section "II". The main section I is indicated by solid lines connecting the elements thereof, and the low pressure control section II is indicated by dashed lines connecting its elements.

The main hydraulic section I is supplied by a main pump 1 from an intake line 2 running from a reservoir or tank 3. The power lift 8, which comprises a simple hydraulic piston and cylinder arrangement, is supplied with pressurized hydraulic fluid via a main line 4 which communicates with a pressure regulating valve 5 and a control valve 6. The control valve has a third connection for a relief line 9 running to the tank.

The power lift control valve 6 is in the form of a 3/3-way valve, for example. It has a sliding valve element or gate (not shown) which is held in a middle position by control springs 11 and 12, and which is controlled via control means 13 and 14 from the low pressure control section II. Control means 13 is controlled from a control line $X_2$, and control means 14 is controlled from a control line $X_1$. Control lines $X_2$ and $X_1$ are supplied from a control pump 15 the delivered pressure of which is regulated by the pressure limiting valve 16. An adjustable or settable throttle 17 included in the low pressure control section II is connected to a second adjustable or settable throttle 19 via a control line 18. Throttle 19 is in turn connected to the tank 3 via a relief line 20a.

If the throttle 17 is set up as the generator of the set point or signal, and throttle 19 is set up as the receiver of the control variable, which receiver is mechanically connected with the driven part of the power lift 8, one obtains a system whereby the position of the lift is regulated to match a given set-point value.

In order to prevent leakage of oil at the lifting cylinder of the lift 8, a so-called "shutoff block" 20 in the form of a hydraulically openable check valve is installed in the main line 4 downstream of the control valve 6. The shutoff block 20 is controlled via a switching line 22, which serves in connection with a device 24 (FIG. 1), so as to actuate or release the shutoff block 20, at least in executing lowering movements of the lift 8. Toward this end, a control arrangement (not specifically illustrated in FIG. 1) is provided which appropriately controls the pressure in the switching line 22.

An exemplary embodiment of a control arrangement in accordance with the present invention will be described with reference to FIG. 2. To simplify the description, the parts which correspond in function to parts of the hydraulic arrangement depicted in to FIG. 1 have been assigned identical reference numerals.

Figure 2:
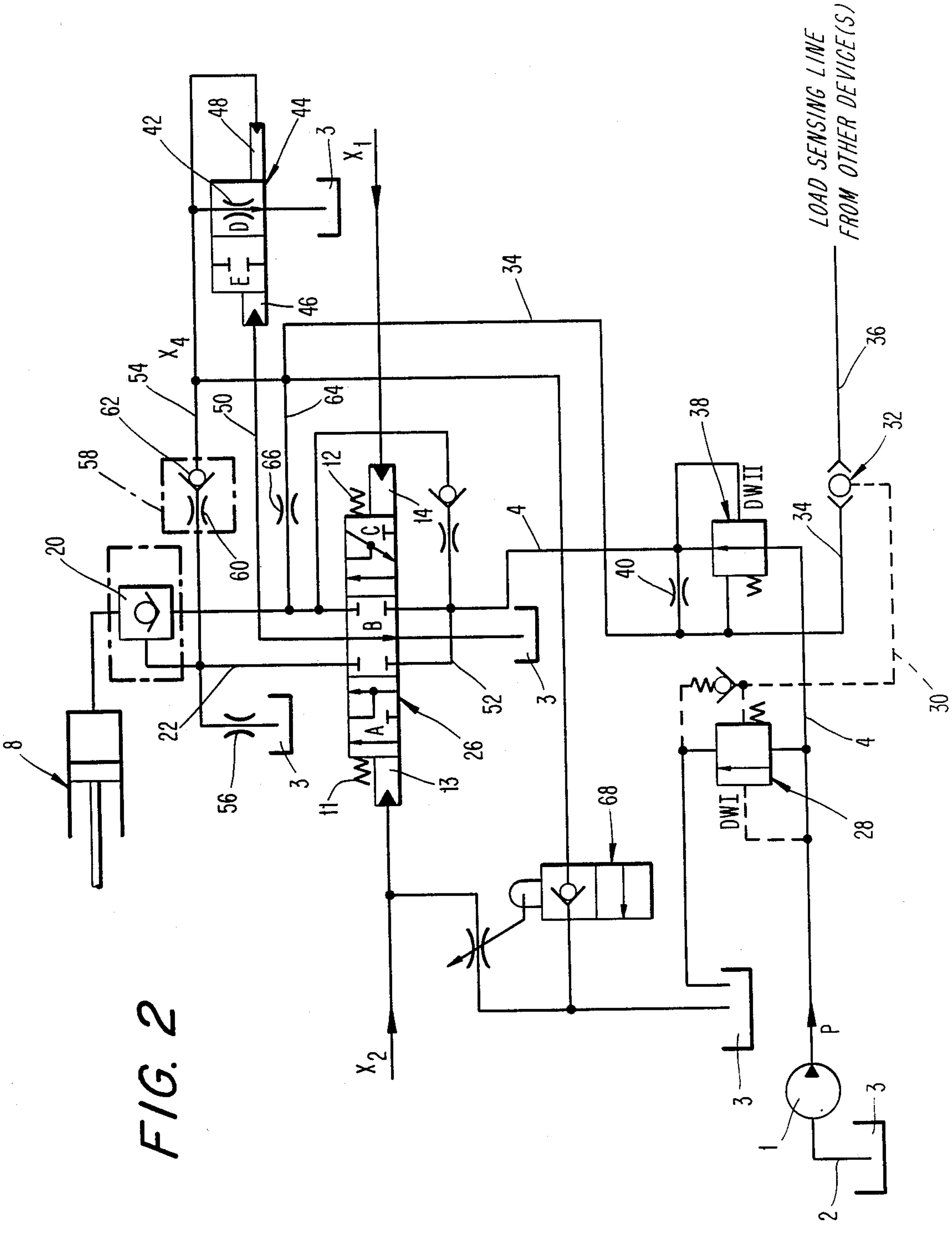
FIG. 2, like FIG. 1, shows a switching arrangement for regulating a power lift, but in this instance there is a control switching arrangement in accordance with the present invention for a hydraulically openable check valve.

FIG. 2 chiefly shows components of the main hydraulic section of the system. The only parts of the low pressure control section which are shown in FIG. 2 are the control lines $X_1$ and $X_2$, which provide control connections to the control means 13 and 14 of a power lift control valve 26 in accordance with the invention. The valve 26 also has a piston-type sliding valve element (not shown) which is held in a middle operating position B by means of control springs 11 and 12.

As in the arrangement of FIG. 1, the main hydraulic section according to FIG. 2 is supplied with pressurized hydraulic fluid from a tank 3 via an intake line 2 and a main pump 1. The pressure in the main line 4 is controlled by a first pressure regulator 28 which may be a piston type pressure regulator. The control is dependent on the pressure in a load-sensing control line 30 originating at a two-way selector valve 32 disposed at the common terminus of load-sensing lines 34 and 36. Load-sensing line 34 is associated with the power lift 8, whereas load-sensing line 36 is associated with one or more other hydraulic load devices. The correct amount of hydraulic fluid is fed to the power lift control valve 26 via a second pressure regulator 38, which may be of the piston type and which acts as a compensation device. These means are active for the case where the other load devices are controlling the first pressure regulator towards a higher pressure, that is, where control signals from the other load devices are tending to set the first pressure regulator to a higher pressure.

Thus, FIG. 2 illustrates a hydraulic power lift control system which is in the form of a so-called "load sensing" system, wherein the first pressure regulator 28 controls the neutral or circulating operation of the main pump 1 at, e.g., 3–5 bar, in situations where no hydraulic energy is required. The connection of the power lift control valve in such cases is as an open-center load-sensing valve. Hydraulic fluid is supplied continuously to a load-sensing line 34 via a purging throttle valve 40 which allows only a relatively small central flow. In order to keep the neutral circulation pressure of the main pump 1 as small as possible, relief means for the load-sensing line 34 to the reservoir tank 3 are provided, in the form of an internal throttle valve 42 of a quick-action slide valve 44. Thereby the pressure in the line 34 is kept as low as possible when the power lift control valve 26 is in the middle (neutral) position, so that the pump pressure in the circulating operating state remains low.

The quick-action slide valve 44 comprises a 2/2 way valve. The valve piston (not shown) has control means 46 and 48 at its opposite ends. Control means 48 is exposed to pressure in the load-sensing line 34, and control means 46 is exposed to pressure in the control pressure line 50. The sizes of the respective control means 46 and 48 are depicted as different in FIG. 2, to signify that the control surface which is exposed to the pressure in the load-sensing line 34 is smaller than the control surface which is exposed to the pressure in the control pressure line 50. This design relationship of the parameters of the control means ensures that the movement of said piston from the position D shown in FIG. 2 to the second operating position E (wherein the internal throttle valve 42 is blocked off) is accomplished reliably and quickly.

A more detailed description of the control of the shutoff block 20 will follow. For opening the shutoff block 20, the switching line 22 runs from the power lift control valve 26 and may be connected through the valve 26 to the main line 4 via a connecting branch line 52. The switching line 22 is also connected to the load-sensing line 34 via a connecting line 54. A relief channel from the switching line 22 to the tank 3 is provided via a relief throttle valve 56.

A valve unit 58 is included in connecting line 54. This valve unit 58 is in the form of a throttle check valve having check valve section 62 connected downstream of a throttle valve section 60 which opens in the direction toward the load-sensing line 34.

A control arrangement thus configured operates in the following manner.

When the power lift control valve 26, which is in the form of a 6/3-way valve, is in the neutral position B (FIG. 2), the pump circulation pressure established in the main line 4 is very low, whereby energy losses can be kept as low as possible.

When pressure signals are transmitted to the control means (13, 14) via the control lines ($X_1$, $X_2$), with the intent of producing a lowering by the power lift 8, the valve piston (not shown) of the control valve 26 is moved into operating position C. In this condition of the valve 26, the control pressure line 50 of the quick-action slide valve 44 continues to be open to the tank 3. Further, the main line downstream of the control valve 26 is connected to the tank, while at the same time the main line connection going upstream (toward the pump) remains closed off. The connecting branch 52 is connected through the valve 26 to switching line 22, so that the pump circulation pressure can be developed in the switching line. However, the previously existing or normal level of pump circulation pressure would not be high enough to be able to actuate the shutoff block 20. Hydraulic fluid fed into the switching line 22 flows via the throttle check valve 58 into the load-sensing line 34. The internal throttle valve 42, which is at a setting fixed to coordinate with the size of the purging throttle 40 is no longer capable of passing this entire additional amount of fluid into the tank. Accordingly, a higher pressure develops in the load-sensing line 34 and acts on the pressure regulator 28 via the selector valve 32 and the load-sensing control line 30. This increased pressure in the control line 30 produces the effect that the pump operating pressure is increased, whereby the pressure in the switching line 22 is also increased. As soon as this pressure in line 22 reaches a specific limit value, the shutoff block 20 opens and the power lift 8 begins the lowering movement. When this lowering by the lift 8 has proceeded sufficiently, the valve piston in the control valve 26 returns to the neutral operating position B wherein the connection of the main line 4 is again blocked off. The shutoff block 20 is relieved via relief throttle valve 56, and returns to its closed position.

When it is desired that the power lift produce a lifting motion, the valve piston of the control valve 26 is moved into switching position A, in which the main line 4 is connected through the valve 26 to the lift cylinder 8. In addition, the full pump pressure is transmitted to the control pressure line 50 of the quick-action slide valve 42. As in the previous case, the connecting branch 52 becomes connected to the switching line 22, so that the shutoff block 20 is again actuated. This exposure of the switching line to the pump pressure is not absolutely necessary, however, because the pressure in the main line downstream of the control valve 26 is sufficient to open the check valve.

The transmission of the pump pressure to the control pressure line 50 causes the valve piston (not shown) of the quick-action slide valve 44 to move to the right (FIG. 2), via the effect of the control means 46, whereby the 2/2-way valve takes the position E wherein the throttle 42 is closed off. In this way, a pressure is produced in the load-sensing line 34 which is a monitoring pressure undistorted by throttle 42 and which is obtained via a branch line 64 and a throttle 66.

When the power lift 8 reaches a limiting or detent condition, an end switch 68 is actuated which causes the load-sensing line 34 to be relieved to the tank 3, so that the pump is again controlled in circulation operation.

The control switching arrangement according to the present invention has been described here with reference to a power lift control system wherein the control signals are supplied via the control lines $X_1$ and $X_2$ running from a low pressure control section. However, the control arrangement is not limited to such a control system, because it can be employed for a pure power lift control system (i.e. with unmediated fluidics) wherein the pressures in the control lines $X_1$ and $X_2$ are direct acting or pure control pressures.

Figure 3:
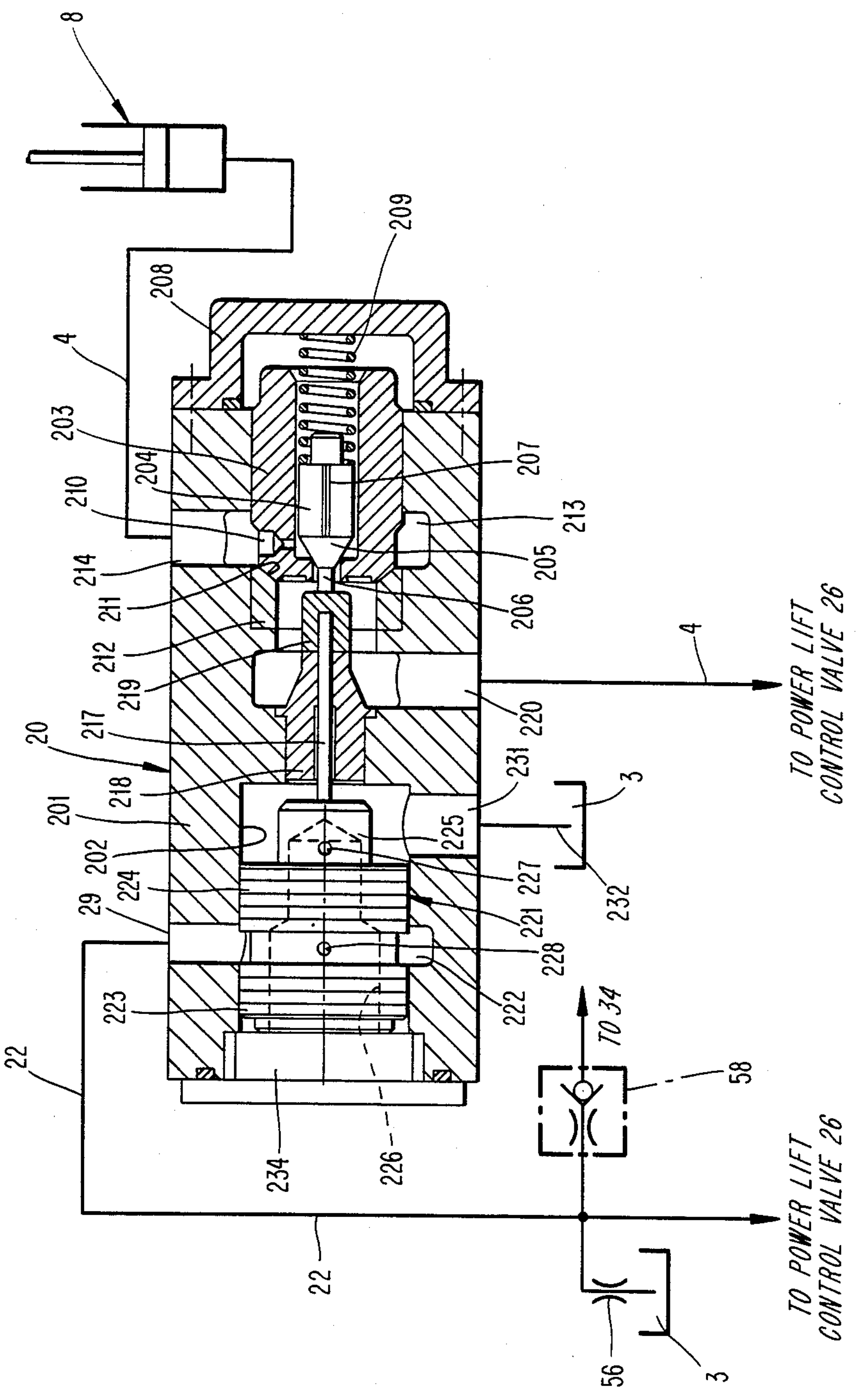
FIG. 3 shows an embodiment of the hydraulically openable check valve shown schematically in FIG. 2.

It is clear from the preceding description that the novel control switching arrangement for controlling a power lift is realized at very low cost. An ordinary shutoff block of the type illustrated in FIG. 3 can be employed. For simplification, elements in FIG. 3 which correspond to elements shown in FIG. 1 and 2 have been assigned the same respective reference numerals. The shutoff block 20 is controlled from the switching line 22 running from the power lift control valve 26. The pressure in line 22 can in turn be controlled via the throttle check valve 58. The main line 4 leading to the power lift 8 passes via a check valve contained in the shutoff block 20, which check valve can be opened hydraulically.

Toward this end, a valve housing 201 has a multiply sectored longitudinal bore 202 (i.e., a longitudinal bore 202 of multiply varied diameter). On the right side of bore 202 in FIG. 3, a ring-shaped closing element 203 is mounted so as to be axially slidable. A pre-control member 204 is coaxially disposed in element 203 and is also axially slidable. It has a valve poppet 205 which cooperates with a valve seat in the bottom or inner end of the closing element 203. Poppet 205 has on its tip a rod member 206 which passes through the bottom of the closing element 203 and extends beyond said element 203. A longitudinal groove 207 is present in the cylindrical part of the pre-control member 204 which cylindrical part slides in the closing element 203. This groove 207 provides communication between the two sides of member 204. A valve spring 209 is compressed between the pre-control member 204 and a cover 208 mounted by screw means to the valve housing 201. The closing element 203 has a throttle structure 210 in its side wall near its bottom. This throttle 210 opens out into the space bounded by the poppet part 205 of the pre-control member 204.

Closing element 203 has a poppet part 211 which cooperates with a ring-shaped piece 212 having a valve seat. The closing element 203 is surrounded by a ring-shaped groove 213 in the valve housing 201 at a point near the bottom of element 203. Groove 213 is connected to a bore 214 which leads to the exterior and to which the main line 4 leading to the power lift 8 is connected.

A push rod 217 is axially translatably mounted in a bearing part 218 in the longitudinal bore 202, coaxial to the closing element 203. Rod 217 has a head 219 which interacts with the rod member 206. The main line 4 running from the power lift control valve 26 opens out into the shutoff block 20 at a bore 220.

On the left side (FIG. 3) of the rod 217 a control piston 221 is axially slidably mounted coaxially with the closing element 203. This piston has two piston segments 223 and 224 separated by a ring-shaped groove 222, which segments are slidably mounted in a widened segment of the bore 202. The piston has a smaller-diameter projection 225 on the side facing the closing element 203, and further has a varying diameter blind bore 226 (dotted lines). A throttle bore 227 which opens into blind bore 226 is present in the region of the projection 225, and a second throttle bore 228 opening into blind bore 226 is present in the region of the groove 222.

The shutoff block 20 is connected to the switching line 22 at a bore 29. A transverse bore 231 communicates with the tank 3 via a line 232. The control-piston side (i.e., the left side in FIG. 3) of the valve housing 201 is closed off by a screw plug 234.

To raise the piston in the power lift 8, an elevated pressure is developed in the main line 4 which first causes the pre-control member 204 to retract and then causes the closing element 203 to move away from the valve seat 212.

To lower the piston in the power lift 8, control action is applied to the pre-control member 204 and the closing element 203. For this purpose, pressure is transmitted to the bore 29 via the switching line 22, wherewith pressurized medium flows into the blind bore of the control piston 221 via the throttle bore 228, with accompanying pressure drop. Because less pressure medium flows out of the throttle bore 227 than is supplied into the throttle bore 228, there is a pressure buildup on the left side (FIG. 3) of the control piston 221, thereby displacing said piston rightward. The control piston 221, via the push rod 217, exerts a control action on, first, the pre-control member 204, and then the closing element 203, whereby the working piston of the power lift can be lowered.

Thus, the invention provides a control switching arrangement for a control system of a hydraulic power lift, said control system comprising a power lift control valve which is itself controlled via control lines in a low pressure section. The main hydraulic section is controlled by the said control valve via a check valve which is hydraulically openable, at least for carrying out lowering movement by the power lift. The check valve is opened via the said control valve itself. Although the pressure furnished to the switching line during idling conditions of the system is a low pressure generally equal to the circulation pressure of the main hydraulic section, a mechanism is provided whereby, in the switching state which corresponds to lowering of the power lift, the circulation pressure of the main hydraulic section can be increased. With this control system, the low pressure control section is simplified, and energy losses in the control system are kept as low as possible.

Although the invention has been illustrated and described in detail with reference to an illustrated embodiment, variations will be evident to persons skilled in the art.

What is claimed is:

1. A control switching arrangement for a hydraulic power lift control system comprising a power lift control valve controlled via control lines in a low pressure section and which in turn controls a main hydraulic section via a check valve which is hydraulically openable at least for carrying out lowering movement by the power lift; wherein the check valve is opened via the power lift control valve which transmits neutral circulation pressure of the main hydraulic section to a switching line; and wherein means are provided by which pump circulation pressure can be raised in a switching state of the power lift control valve corresponding to a lowering movement of said power lift, said means including a throttle in a connecting line positioned between the switching line and a load-sensing line of the control valve.

2. A control switching arrangement according to claim 1, comprising a check valve connected downstream of the throttle in the connecting line.

3. A control switching arrangement according to claim 1, wherein during circulation operation of the pump of the main hydraulic section, the load-sensing line is provided with a predetermined purge amount of hydraulic fluid which can be throttled to a tank via an internal throttle of a quick-acting slide valve when said slide valve is in a given limit position.

4. A control switching arrangement according to claim 3, wherein a flow-passage characteristic of the internal throttle is adjusted to the predetermined purge amount of hydraulic fluid.

5. A control switching arrangement according to claim 3, wherein the load-sensing line of the power lift control valve is supplied from the main hydraulic section via at least a purging throttle when the pump of the main hydraulic section is in the circulating operating mode.

6. A control switching arrangement according to claim 3, wherein the power lift control valve also controls the quick-acting slide valve.

7. A control switching arrangement according to claim 6, wherein the quick-acting slide valve has a piston which in one direction is exposed to the pressure in the load-sensing line of the control valve and in the other direction is exposed to a control pressure which is controllable by the control valve in such a way that the internal throttle can be shut off from the tank when the control valve is in a position for lifting.

8. A control switching arrangement according to claim 6, wherein the control valve is a 6/3-way valve, a control piston of which is spring-centered in a middle position wherein and connections of said control valve to the main hydraulic section and to the switching line are blocked, the control pressure of the quick-acting slide valve being controlled at the pressure of the tank.

9. A control switching arrangement according to claim 8, wherein, when the control valve for the power lift a position for lowering said lift, the pump-side connection of the main hydraulic section is blocked off, the power-lift-side connection is switched to lead to the tank, and the switching line is controlled at the pressure of the main pressure line.

10. A control switching arrangement according to claim 8, wherein, when the control valve is in a position for lifting the lift, the main pressure line and the switching line are controlled at a higher pressure, and the control pressure line of the quick-acting slide valve is connected to the main pressure line.

11. A control switching arrangement according to claim 1, wherein the load-sensing line acts on a piston-type pressure regulator of the main hydraulic section, via a selector valve, in such a way that, when the pressure in the load-sensing line is increased, the pump of the main hydraulic section can be throttled-up to a higher pressure.

12. A control switching arrangement according to claim 11, wherein the main hydraulic section includes a compensator pressure regulator disposed downstream of the piston-type pressure regulator, the compensator pressure regulator controlling the amount of hydraulic fluid provided to the control valve when additional consuming devices are connected and the pump pressure is to be increased.

13. A control switching arrangement according to claim 1, wherein the switching line is connected to the tank via a relief throttle.

14. A control switching arrangement according to claim 1, wherein the control valve comprises a regulating valve for the power lift.

15. A control switching arrangement according to claim 14, wherein the regulating valve is a open-center load-sensing valve.

16. A control system for a hydraulic power lift comprising pump means for pressurizing hydraulic fluid, a main control valve operably connected to said pump means and having a first condition in which hydraulic fluid under pressure is directed toward said power lift to produce a lifting movement and a second condition in which hydraulic fluid from said power lift is passed in a reverse direction to said main control valve, a hydraulically operable check valve interposed between said main control valve and said power lift for normally blocking said reverse flow from said power lift, means for transmitting hydraulic fluid pump pressure to said check valve for actuating said check valve to open it to reverse flow of hydraulic fluid, said means for transmitting hydraulic fluid pump pressure to said check valve. including a switching line communicating with said pump means when said main control valve is in said second condition; and means for providing increased pump pressure when said main control valve is in said second condition to cause actuation of said check valve at that time, said means for providing increased pump pressure including pressure regulator means operably associated with said pump means, a load sensing line, means responding to pump pressure in said switching line for causing an increase in the pressure in said load sensing line, and means for increasing the pressure setting of said pressure regulator means when the pressure in said load sensing line increases.

* * * * *